(12) United States Patent
Bruce et al.

(10) Patent No.: US 8,094,798 B2
(45) Date of Patent: Jan. 10, 2012

(54) TELEMATICS UNIT NUMBER PROVISIONING

(75) Inventors: Yaovi S. Bruce, Lake Orion, MI (US); Laura Chmielewski, Huntingdon Woods, MI (US); William E. Italia, Howell, MI (US)

(73) Assignee: General Motors, LLC, Detroit, MI (US)

( * ) Notice: Subject to any disclaimer, the term of this patent is extended or adjusted under 35 U.S.C. 154(b) by 989 days.

(21) Appl. No.: 12/033,723

(22) Filed: Feb. 19, 2008

(65) Prior Publication Data

US 2009/0207994 A1   Aug. 20, 2009

(51) Int. Cl.
*H04M 3/42* (2006.01)
*H04W 64/00* (2009.01)

(52) U.S. Cl. ............ 379/201.12; 379/221.14; 455/456.3

(58) Field of Classification Search ............. 379/201.01, 379/201.12, 221.14; 455/456.1, 456.3
See application file for complete search history.

(56) References Cited

U.S. PATENT DOCUMENTS

| | | | |
|---|---|---|---|
| 7,224,969 B2 * | 5/2007 | Stark et al. | 455/432.3 |
| 7,236,783 B2 * | 6/2007 | Gould | 455/435.1 |
| 7,292,848 B2 * | 11/2007 | Mazzara et al. | 455/419 |
| 2009/0088153 A1 * | 4/2009 | Krause et al. | 455/433 |

* cited by examiner

*Primary Examiner* — Harry Hong
(74) *Attorney, Agent, or Firm* — Leydig, Voit & Mayer, Ltd.

(57) ABSTRACT

Examples of the invention are used to provide a system and method for provisioning a telematics unit number based on a phone number already used by a customer. In examples, the telematics unit is provisioned with a number that aligns with a rate center plan, which is likely to result in a number that is local to a number the customer uses for dialing the unit and/or matches the area code of a number on the customer's account. In example a wireless telephone number is assigned to a vehicle telematics unit from an inventory of available wireless telephone numbers by querying the inventory to identify the wireless telephone number that matches one or more of the customer's home rate center, customer's NPA, customer's NXX, and customer's overlay NPA information based on a plurality of predetermined conditions.

9 Claims, 3 Drawing Sheets

| RATE CENTER | NPA | NXX | STATION CODE |
|---|---|---|---|
| A | 708 | 344 | 1111 |
| A | 708 | 457 | 2222 |
| A | 708 | 299 | 3333 |
| A | 708 | 355 | 4444 |
| A | 708 | 467 | 5555 |
| A | 464 | 555 | 6666 |
| A | 464 | 556 | 7777 |
| B | 219 | 678 | 8888 |
| B | 219 | 789 | 9999 |
| B | 219 | 890 | 1211 |
| C | 708 | 908 | 1311 |
| C | 708 | 234 | 1411 |
| C | 708 | 345 | 1511 |
| C | 708 | 456 | 1611 |
| C | 464 | 222 | 1711 |
| C | 464 | 333 | 1811 |
| D | 708 | 999 | 1911 |
| D | 708 | 888 | 1121 |
| D | 708 | 777 | 1131 |
| D | 464 | 666 | 1141 |
| D | 464 | 444 | 1151 |

TELEMATICS UNIT NUMBER PROVISIONING

FIELD OF THE INVENTION

This invention relates generally to the field of telematics and more specifically to the field of telematics unit provisioning.

BACKGROUND OF THE INVENTION

Many modern vehicles incorporate telematics devices for providing a variety of fee-based subscription services in a mobile environment, including navigational assistance. An in-vehicle telematics device typically includes a plurality of communication interfaces, including cellular and/or satellite transceivers. As part of providing navigational assistance, for example when requesting and receiving road network data, a telematics device may need to establish a radio communication link with a call center via a wireless (e.g., cellular) network.

In the process of provisioning a telematics unit, the telematics service provider needs to assign a wireless telephone number to the telematics unit for communicating data. Hence, the customer dials the assigned wireless number to communicate with the telematics unit from an outside number.

The typical process of provisioning a wireless telephone number for a telematics unit involves selecting an available number based on a customer's zip code, which may result in a number that is dissimilar from the customer's other contact numbers. Consequently, such number may be difficult to remember, such as when the customer's zip code is served by multiple area codes.

Since telematics services are frequently used, a telematics unit number that is difficult to remember may decrease customer safety, as well as reduce customer satisfaction with the telematics services in general.

BRIEF SUMMARY OF THE INVENTION

A system and method are provided for provisioning a telematics unit number based on a phone number already used by a customer, thereby increasing customer satisfaction and enhancing usability. In an example, the telematics unit is provisioned with a number that aligns with a rate center plan, which is likely to result in a number that is local to a number the customer uses for dialing the unit and/or matches the area code of a number on the customer's account. As an added benefit, this allows the telematics service provider and/or wireless service provider to better fulfill depleted inventory of available telephone numbers.

In one aspect of the invention, a method is provided for assigning a wireless telephone number to a vehicle telematics unit, the wireless telephone number conforming to a North American Numbering Plan, the method comprising (a) electronically storing available wireless telephone number inventory, wherein the inventory comprises a plurality of fields comprising a rate center field, a Numbering Plan Area Code (NPA) field, and an Exchange Code (NXX) field, where the rate center field is selected from the group consisting of one or more of a local rate center, a non-local rate center, an in-state rate center, and an out-of-state rate center, (b) parsing customer account information to identify a customer's home rate center, customer's NPA, customer's NXX, and customer's overlay NPA information based on the customer's existing telephone number included in the customer account information, and (c) assigning a wireless telephone number from the inventory to the telematics unit by querying the inventory to identify the wireless telephone number by matching one or more of the customer's home rate center, customer's NPA, customer's NXX, and customer's overlay NPA information to the plurality of fields in the inventory based on a plurality of predetermined conditions, wherein the plurality of predetermined conditions comprises determining whether the customer's NPA matches an NPA in the inventory corresponding to an in-state rate center which is non-local and separately determining whether the customer's overlay NPA matches an overlay NPA in the inventory corresponding to the in-state rate center which is non-local.

In another aspect of the invention, a telematics system for assigning a wireless telephone number to a vehicle telematics unit is provided, the wireless telephone number conforming to a North American Numbering Plan, the system comprising (a) a database for storing available wireless telephone number inventory, wherein the inventory comprises a plurality of fields comprising a rate center field, an NPA field, and an NXX field, where the rate center field is selected from the group consisting of one or more of a local rate center, a non-local rate center, an in-state rate center, and an out-of-state rate center, and (b) a server for receiving a provisioning request for assigning the wireless telephone number to the telematics unit, the server assigning a wireless telephone number from the inventory to the telematics unit by querying the database to identify the wireless telephone number by matching one or more of a customer's home rate center, a customer's NPA, a customer's NXX, and a customer's overlay NPA information to the plurality of fields in the inventory based on a plurality of predetermined conditions, wherein the server evaluates the plurality of predetermined conditions comprising determining whether the customer's NPA matches an NPA in the inventory corresponding to an in-state rate center which is non-local and separately determining whether the customer's overlay NPA matches an overlay NPA in the inventory corresponding to the in-state rate center which is non-local.

DETAILED DESCRIPTION

Figure 1:
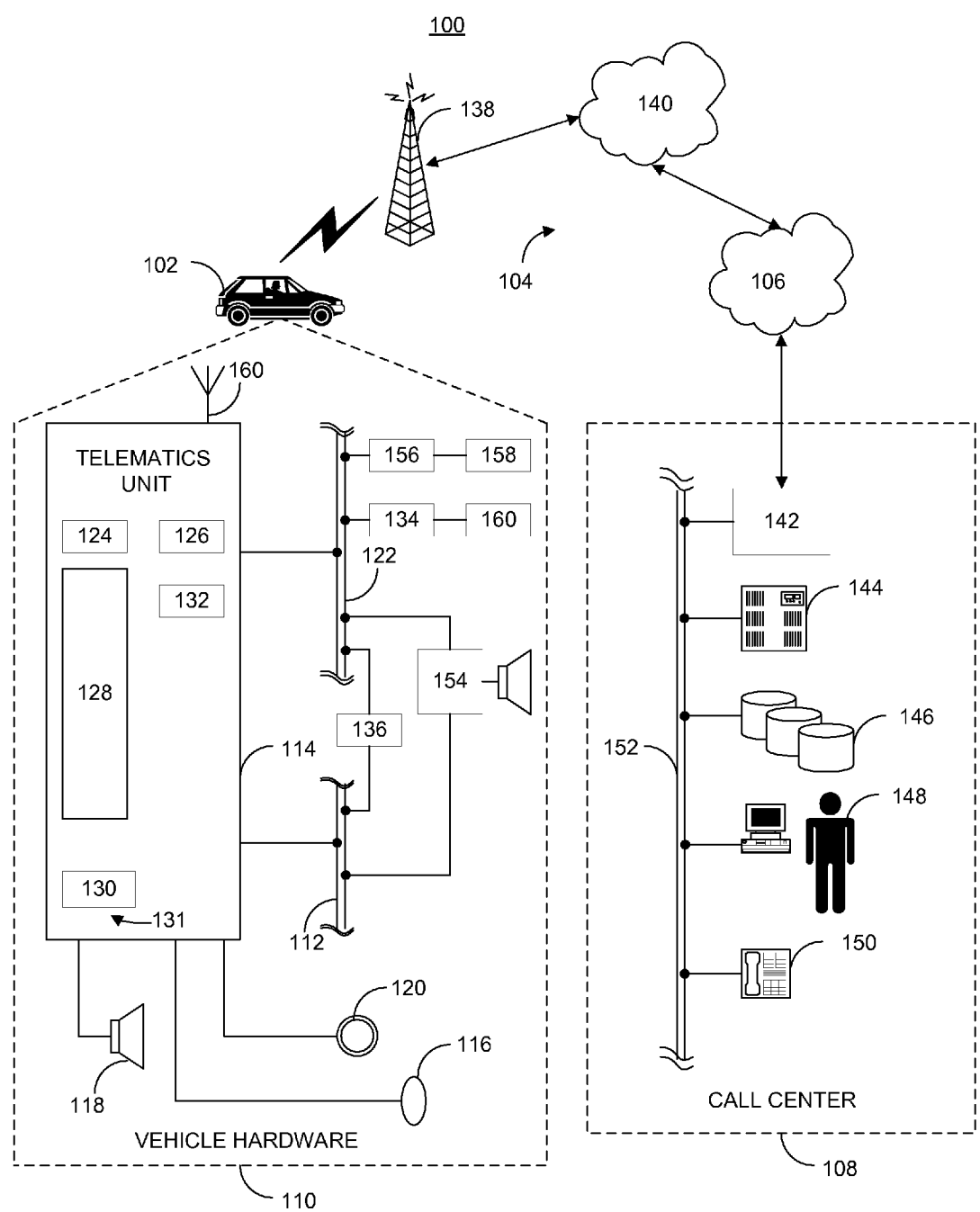
FIG. 1 is a schematic diagram illustrating a system for delivery of in-vehicle telematics services, as contemplated in an example of the present invention.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130 having stored thereon software 131, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Examples vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As part of telematics unit provisioning, such as during the initial telematics service setup, the call center 108 needs to assign a wireless telephone number to the telematics unit 114 for accessing the wireless carrier system 104. To this end, the call center 108 receives available wireless telephone number inventory from the wireless carrier system 104 and selects an available wireless telephone number based on the customer's home rate center.

Figures 2, 3:
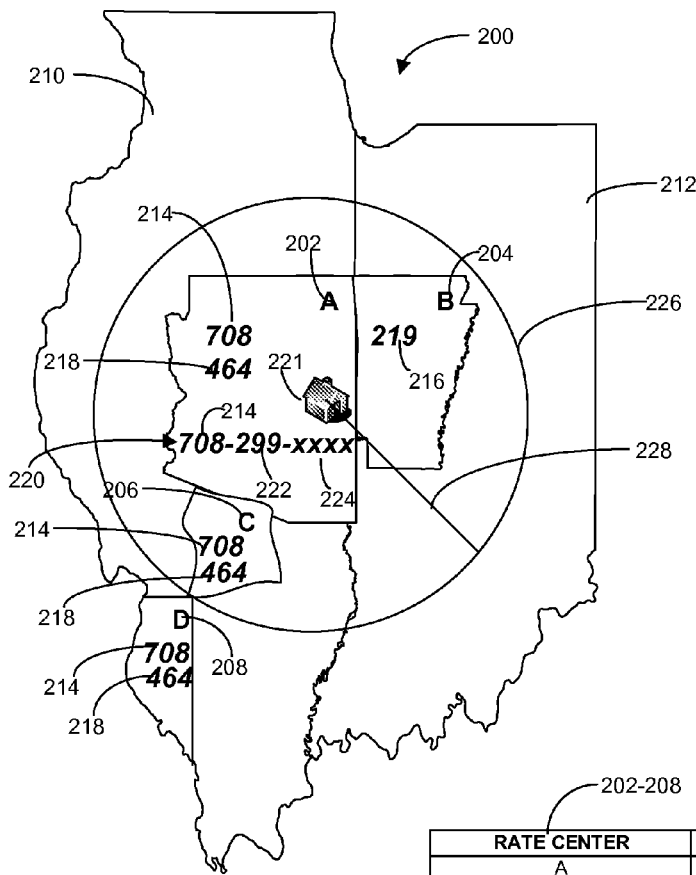
FIG. 2 is a schematic diagram of an example of a multi-state telephone rate center map including a plurality of rate centers geographically disposed throughout multiple state boundaries, in accordance with an example of the invention.
FIG. 3 is a diagram of a wireless telephone number inventory comprising rate center information, corresponding NPA-NXX information, as well as station code information, in accordance with an example of the invention.

Turning to FIG. 2, an example of a multi-state telephone rate center map 200 is shown including a plurality of rate centers 202-208 geographically disposed throughout multiple state boundaries 210, 212. In accordance with a North American Numbering Plan (NANP), each rate center 202-208 is associated with a Numbering Plan Area Code (NPA) 214, 216 and, optionally, with one or more overlay NPA codes 218, such as when additional area codes are necessary to increase the available telephone number inventory within a given rate center. Customer's telephone number 220 is associated with a home rate center 202. In one example, the customer's telephone number 220 is a land line telephone number (e.g., a customer's home telephone number or a telephone number of a local car dealer that sold the vehicle 102 to the customer). Customer's telephone number 220 comprises a ten digit number with first three digits corresponding to the NPA 214 and the next three digits 222 corresponding to one of a plurality of Exchange Codes (NXX) available within the customer's home rate center 202. The remaining four digits 224 correspond to a station code that uniquely defines each telephone number. Telephone calls between a telephone number matching the NPA-NXX combination of customer's telephone number 220 and a number within a local calling zone 226, whether such number is located within a home rate center 202 or within any of the nearby rate centers 204, 206 falling within the local calling zone 226, carry a local rate. The local calling zone 226 spans a plurality of adjacent rate centers 202-206, which may be served by the same local exchange or telephone switch and/or same central office. In one example, the local calling zone 226 is geographically defined via a local calling radius 228 (e.g., within 15 miles from customer's location/address 221 that corresponds to the NPA-NXX combination of the telephone number 220 associated with the customer's account). Alternatively or in addition, the local calling zone 226 is defined via a lookup table of rate centers and corresponding NPA-NXX combinations eligible for local rates. In yet another example, when the customer's telephone number 220 is a wireless (e.g., cellular) number, the local calling zone 226 comprises a plurality of rate centers falling within a Metropolitan Statistical Area (MSA) and/or Rural Service Area (RSA) served by one or more MSCs 140 of the wireless carrier system 104.

To assign a wireless telephone number to the telematics unit 114, the server 144 of the call center 108 periodically receives an inventory of wireless telephone numbers that are available for assignment from the wireless carrier system 104 and stores it in one or more databases 146. In an example, the server 144 and/or the databases 146 include multiple servers and databases external to the call center 108 and connected via a network. As illustrated in FIG. 3, the information comprising available wireless telephone number inventory 300 comprises rate center information 202-208, corresponding NPA-NXX information 214-218, 302, as well as station code information 304.

To assign a phone number to a telematics unit 114 that is related to a number which is familiar to the customer, the server 144 includes computer executable code for querying the available number inventory 300 and selecting a number that most closely matches the NPA-NXX 214, 222 of the telephone number 220 associated with the customer's account. In one example, the available number inventory 300 is sorted by a rate center 202-208 to facilitate number selection within the customer's home rate center 202 or local rate centers 204, 206 in the local calling area 226.

Figure 4:
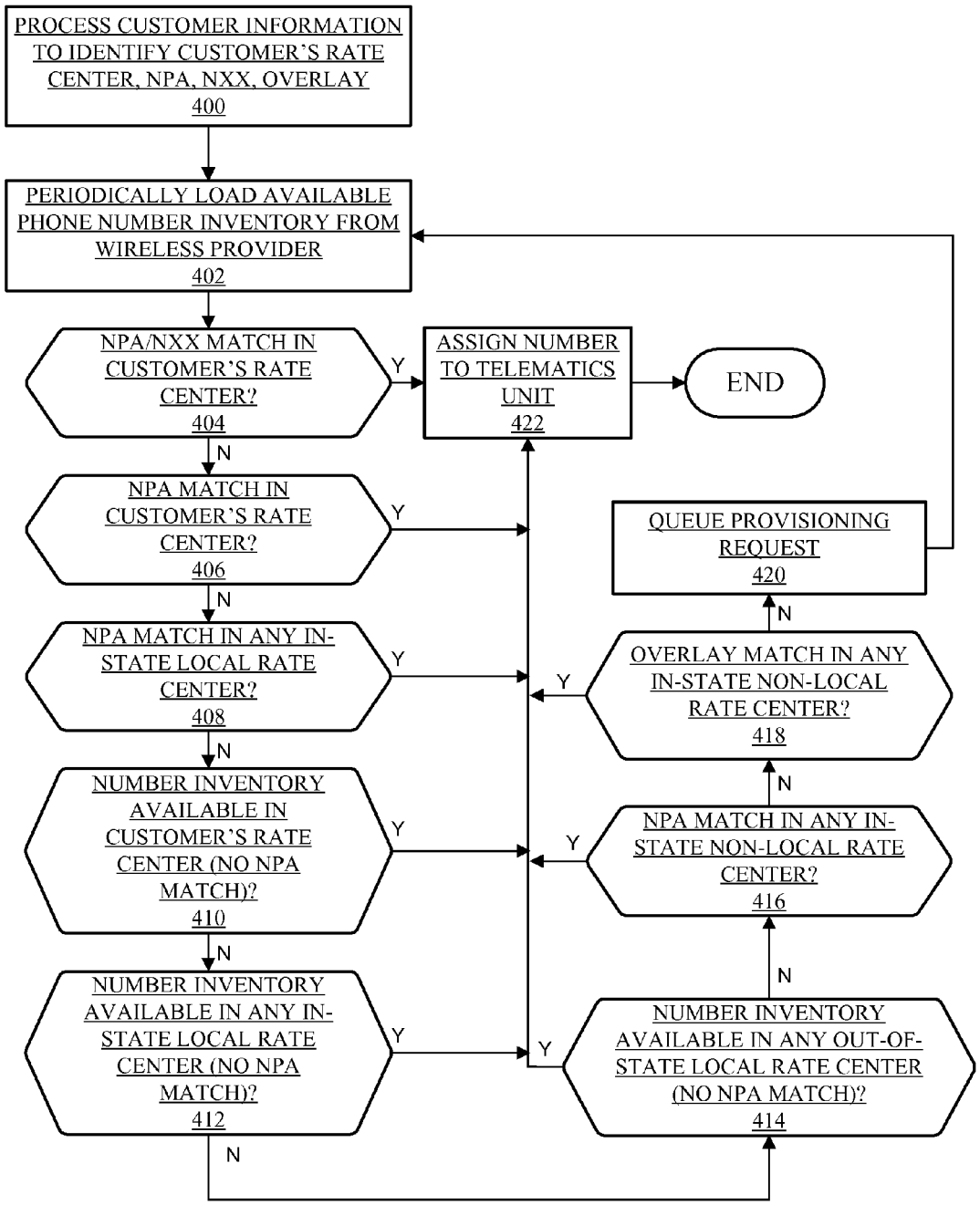
FIG. 4 is a flow chart illustrating a method for provisioning a telematics unit of FIG. 1 with a wireless telephone number, in accordance with an example of the invention.

With reference to FIG. 4, a method for provisioning a telematics unit 114 with a new wireless telephone number is shown. To setup the customer's telematics account (e.g., when a customer purchases a new vehicle or during account reactivation), the call center 108 receives a provisioning request to setup the customer's telematics unit with a wireless telephone number. In step 400, the server 144 processes one or more contact telephone numbers within the customer account information to identify the customer's home rate center 202 and its corresponding NPA, NXX 214, 222, and, if available, overlay NPA information 218. In one example, the server 144 references an NPA-NXX lookup table to identify the customer's home rate center 202. The server 144 parses the customer account information, including one or more contact phone numbers, from a telematics services application submitted by the customer or customer's vehicle dealer pursuant to a new vehicle purchase or account activation/reactivation. Preferably, when the account information includes the customer's home telephone number, the server 144 parses it to determine the customer's home rate center 202, as well as the customer's NPA 214, NXX 222, and any overlay NPA 218 corresponding to the home rate center 202. Otherwise, the server 144 parses a vehicle dealer's telephone number from the customer account data to set the customer's home rate center 202, as well as NPA, NXX, and overlay NPA associated with customer's home rate center. When the customer's home telephone number is not available, the vehicle dealer's number provides an alternative estimate of a rate center that is likely to fall within the local calling zone 226. In yet another example, when the customer's home telephone number is not available, the server 144 utilizes the customer's current wireless telephone number listed on the account application to identify the customer's home rate center 202, NPA 214, NXX 222, as well as any overlay NPA information 218.

In an example, the server 144 assigns priority to the type of contact numbers listed on the telematics services application that are used to identify the customer's home rate center, NPA, NXX, and overlay NPA. For example, when multiple contact numbers are available, the server 144 uses a home telephone number. If the home number is not available the server 144 uses the vehicle dealer's phone number. Otherwise, the customer's current wireless telephone number is used.

In step 402, the server 144 periodically receives an inventory 300 of wireless telephone numbers that are available for assignment to new telematics units 114 from the wireless carrier system 104 and loads the available number inventory 300 into one or more subscriber databases 146. Next, in steps 404-418, the server 144 executes a series of instructions for determining the best NPA-NXX combination for a wireless telephone number to be assigned to the telematics unit 114 in order to maximize the likelihood of selecting a number within a local calling zone 226, as well as to provide the customer with a telematics unit number that is familiar and easy to remember.

Hence, if, in step 404, the available number inventory includes an exact NPA-NXX combination 214, 222 within the home rate center 202 that matches the customer's telephone number 220 (except for the last four digits 224), the server 144 assigns 422 such number to the telematics unit 114 and the process ends. This results in a telematics unit number that is likely to be within the local calling zone 226 most of the time and closely matches the customer's existing contact number. Otherwise, in step 406, the server 144 determines whether the available number inventory 300 includes the customer's NPA 214 within the customer's home rate center 202 and assigns 422 such number to the telematics unit 114. If not, in step 408, the server 144 queries the available number inventory 300 to determine whether there are any numbers having the customer's NPA 214 available in any in-state local rate center. For example, referring to FIGS. 2 and 3, if the customer's NPA 214 is "708," the server 144 will search rate centers A (i.e., a home rate center 202) and C (rate center 206) that fall within the local calling zone 226 and are located within the customer's home calling state 210 to locate an available wireless number with a matching NPA 214 of "708." If a match is found, the server 144 assigns 422 such number to the telematics unit 114. This results in a telematics unit number which is local and has the same area code/NPA as the customer's current contact number.

If the available number inventory 300 does not contain a number with the customer's NPA 214 in one of the local in-state rate centers 202, 206, in step 410, the server 144 searches for any number available within the customer's home rate center 202, including numbers having an overlay NPA 218. Likewise, in step 412, if the server 144 is not able to locate any available numbers within the customer's home rate center 202, it queries the number inventory 300 within the database 146 for any available wireless numbers in any in-state local rate center. For example, in step 412, the server 144 searches for any available numbers within an in-state local rate center 206 (rate center C in FIG. 2), including numbers having an overlay NPA 218 and corresponding to the "464" area code (FIGS. 2, 3), If the search results of steps 410 and 412 are in the negative, the server 144 next checks whether there are available numbers in any out-of-state, but local rate center, such as the rate center 219 (rate center B, FIG. 2) that is across the state boundary 210 but is adjacent to the home rate center 202 and falls within the local calling zone 226, step 414. When attempts to find a local number are unsuccessful, the server 144 next checks in step 416 whether there is an available number matching the customer's NPA 214 in any in-state but non-local rate centers, such as the rate center 208 (rate center D in FIG. 2). Although this may result in a non-local number, the assigned number will still have the same area code/NPA as the customer's current contact number (e.g., "708") and will be easier to remember than a number with a different area code/NPA. If the query of step 416 is unsuccessful, in step 418, the server 144 searches for available numbers matching an overlay area code/NPA 218 (e.g., NPA "464" in FIGS. 2, 3) of the customer's home rate center 202 in any in-state non-local rate centers, such as the rate center 208 (rate center D in FIG. 2). When a match is found in any of the steps 404-418, the server 144 assigns the identified wireless number to the telematics unit 114. Otherwise, in step 420, the server queues the provisioning request until the available wireless number inventory 300 is updated from the wireless carrier system 104, at which point the server 144 repeats the sequence of steps 404-418 to identify the closest match within the available number inventory.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Examples of this invention are described herein, including the best mode known to the inventors for carrying out the invention. Variations of those examples may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A telematics system for assigning a wireless telephone number to a vehicle telematics unit, the wireless telephone number conforming to a North American Numbering Plan, the system comprising:
   a database for storing available wireless telephone number inventory, wherein the inventory comprises a plurality of fields comprising a rate center field, an NPA field, and an NXX field, where the rate center field is selected from the group consisting of one or more of a local rate center, a non-local rate center, an in-state rate center, and an out-of-state rate center; and
   a server for receiving a provisioning request for assigning the wireless telephone number to the telematics unit, the server assigning a wireless telephone number from the inventory to the telematics unit by querying the database to identify the wireless telephone number by matching one or more of a customer's home rate center, a customer's NPA, a customer's NXX, and a customer's overlay NPA information to the plurality of fields in the inventory based on a plurality of predetermined conditions;
   wherein the server evaluates the plurality of predetermined conditions comprising determining whether the customer's NPA matches an NPA in the inventory corresponding to an in-state rate center which is non-local and separately determining whether the customer's overlay NPA matches an overlay NPA in the inventory corresponding to the in-state rate center which is non-local.

2. The system of claim 1 wherein the server parses customer account information to identify the customer's home rate center, the customer's NPA, the customer's NXX, and the customer's overlay NPA information based on the customer's existing telephone number included in the customer account information.

3. The system of claim 2 wherein the customer's existing telephone number is a customer's home telephone number.

4. The system of claim 2 wherein the customer's existing telephone number is a customer's existing wireless telephone number.

5. The system of claim 2 wherein the customer's existing telephone number is a vehicle dealer's telephone number.

6. The system of claim 1 wherein the server queues a provisioning request for assigning the wireless telephone number to the vehicle telematics unit until satisfying at least one of the plurality of predetermined conditions.

7. The telematics system for assigning a wireless telephone number to a vehicle telematics unit according to claim 1, wherein the server identifies an available wireless telephone number within the inventory corresponding to the customer's home rate center, wherein the identified number does not match the customer's NPA.

8. The telematics system for assigning a wireless telephone number to a vehicle telematics unit according to claim 1, wherein the server identifies an available wireless telephone number within the inventory corresponding to an in-state rate center which is local, wherein the identified number does not match the customer's NPA.

9. The telematics system for assigning a wireless telephone number to a vehicle telematics unit according to claim 1, wherein the server identifies an available wireless telephone number within the inventory corresponding to an out-of-state rate center which is local, wherein the identified number does not match the customer's NPA.

* * * * *